United States Patent
Clothier

(10) Patent No.: US 9,486,109 B2
(45) Date of Patent: Nov. 8, 2016

(54) INDUCTION HEATING SYSTEM EMPLOYING INDUCTION-HEATED SWITCHED-CIRCUIT VESSELS

(75) Inventor: Brian L. Clothier, Wichita, KS (US)

(73) Assignee: TSI Technologies LLC, Wichita, KS (US)

( * ) Notice: Subject to any disclaimer, the term of this patent is extended or adjusted under 35 U.S.C. 154(b) by 518 days.

(21) Appl. No.: 13/547,889

(22) Filed: Jul. 12, 2012

(65) Prior Publication Data

US 2013/0015177 A1 Jan. 17, 2013

Related U.S. Application Data

(60) Provisional application No. 61/572,265, filed on Jul. 14, 2011, provisional application No. 61/690,511, filed on Jun. 28, 2012.

(51) Int. Cl.
*A47J 36/02* (2006.01)

(52) U.S. Cl.
CPC .................... *A47J 36/027* (2013.01)

(58) Field of Classification Search
CPC .................................................. A47J 36/027
USPC ....... 219/620–622, 386, 387, 626, 649, 506, 219/521, 660, 753, 725, 502, 600; 99/331–333, 342, 370, 447, 448, 451, 99/468, 483, DIG. 14; 165/61, 48.1, 63, 165/64, 267, 201, 918, 919; 374/141, 149, 374/150, 162; 392/449, 459; 426/237; 312/236

See application file for complete search history.

(56) References Cited

U.S. PATENT DOCUMENTS

| | | | |
|---|---|---|---|
| 3,943,320 A * | 3/1976 | Bowen | 219/728 |
| 5,201,797 A | 4/1993 | Weng | |
| 5,500,511 A * | 3/1996 | Hansen et al. | 219/633 |
| 5,552,585 A * | 9/1996 | Fleck et al. | 219/732 |

(Continued)

FOREIGN PATENT DOCUMENTS

| CN | WO2009149614 A1 | 12/2009 |
|---|---|---|
| DE | 29820731 U1 | 11/1999 |

(Continued)

OTHER PUBLICATIONS

International Search Report and Written Opinion dated Jan. 21, 2013 for related application PCT/2012/046707; International Filing Date: Jul. 13, 2012.
European Search Report dated Mar. 2, 2015 in related application SN EP 12811973.2.

*Primary Examiner* — Dana Ross
*Assistant Examiner* — Kuangyue Chen
(74) *Attorney, Agent, or Firm* — Hovey Williams LLP

(57) ABSTRACT

An induction heatable article such as a pan is provided having a synthetic resin body with at least one susceptor coil secured to the body and operable under the influence of an induction field to generate Joule heating within the coil to thereby heat the body. The coil has a plurality of zones, each adjacent a different portion of the body and capable of providing respective, different magnitudes of Joule heating-derived energy per unit time in the zones. A multiple-pan, modular food heating/warming table includes a table supporting an array of individually controllable induction heaters with a plurality of synthetic resin, food-holding pans positionable on the table, wherein each pan has a zoned susceptor coil for induction heating of the pans.

21 Claims, 6 Drawing Sheets

(56) References Cited

U.S. PATENT DOCUMENTS

| | | | |
|---|---|---|---|
| 5,954,984 A * | 9/1999 | Ablah et al. ............ | 219/621 |
| 6,021,710 A | 2/2000 | Violi et al. | |
| 6,504,135 B2 | 1/2003 | Clothier et al. | |
| 7,173,411 B1 * | 2/2007 | Pond .................... | 324/207.12 |
| 9,084,295 B2 | 7/2015 | Sadakata et al. | |
| 2002/0113066 A1 | 8/2002 | Stark et al. | |
| 2003/0016560 A1 | 1/2003 | Kawamura | |
| 2008/0197126 A1 * | 8/2008 | Bourke et al. ........... | 219/634 |
| 2011/0090937 A1 * | 4/2011 | Malyshev et al. ........ | 374/163 |
| 2012/0037615 A1 | 2/2012 | Hafner | |

FOREIGN PATENT DOCUMENTS

| | | |
|---|---|---|
| DE | 102006041665 A1 | 4/2008 |
| DE | 102007028122 A1 | 12/2008 |
| DE | 20071053629 A1 | 5/2009 |
| FI | WO2011064455 A1 | 6/2011 |
| JP | 2003-339529 A | 12/2003 |
| JP | 2008-27728 | 2/2008 |
| JP | 2009087703 | 4/2009 |
| SU | 972259 A1 * | 11/1982 |

* cited by examiner

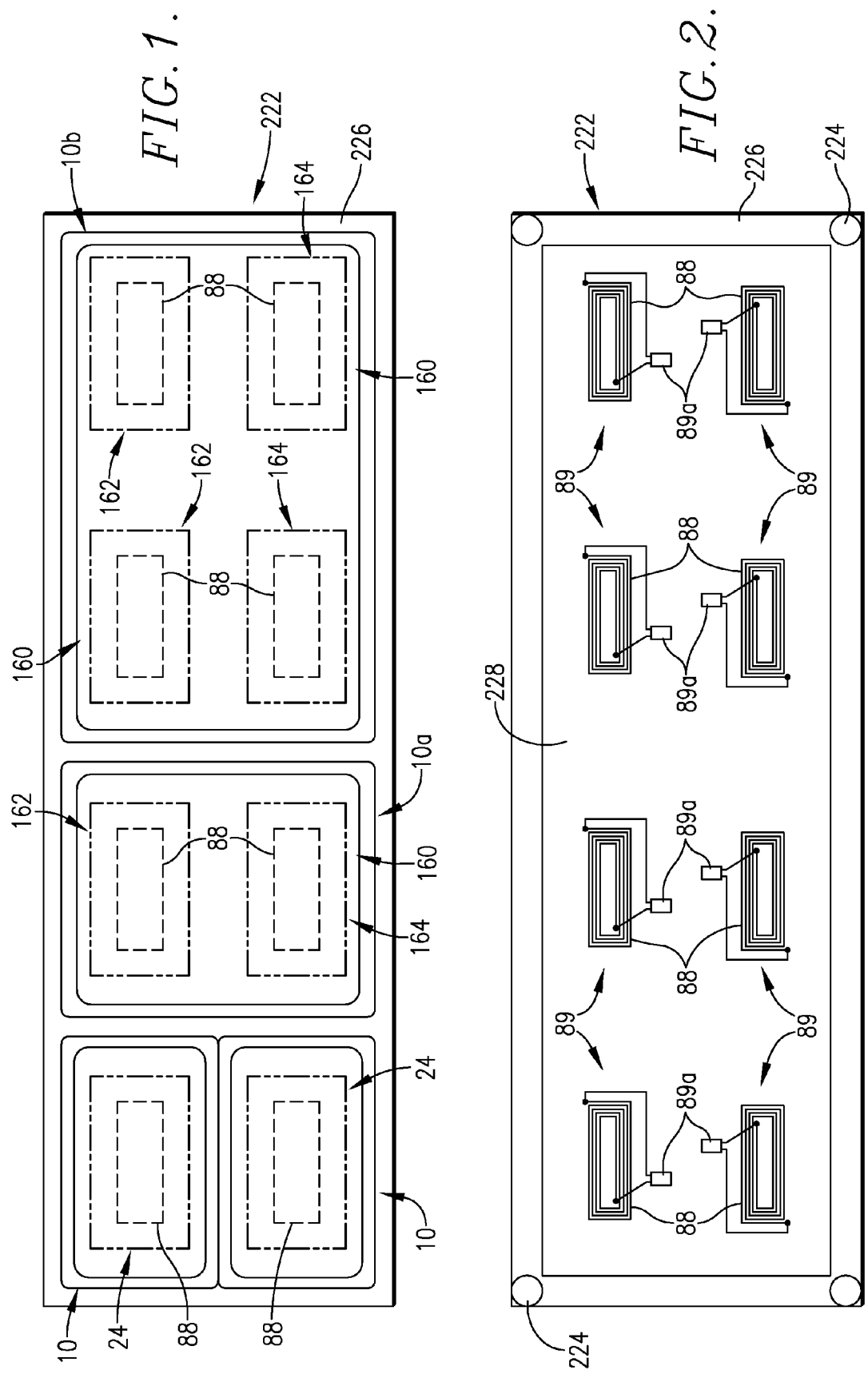

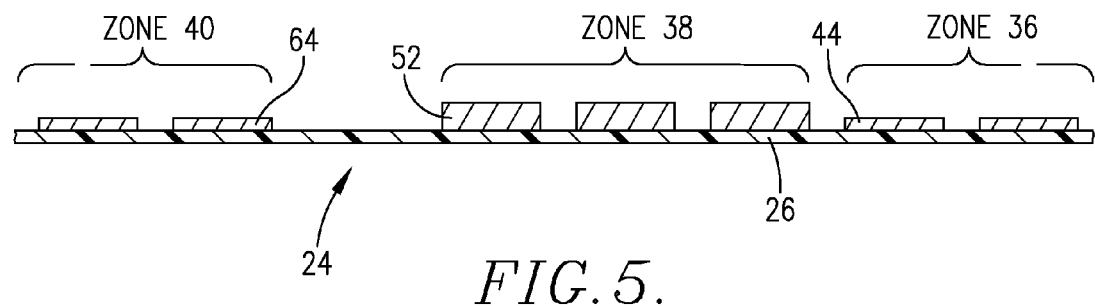
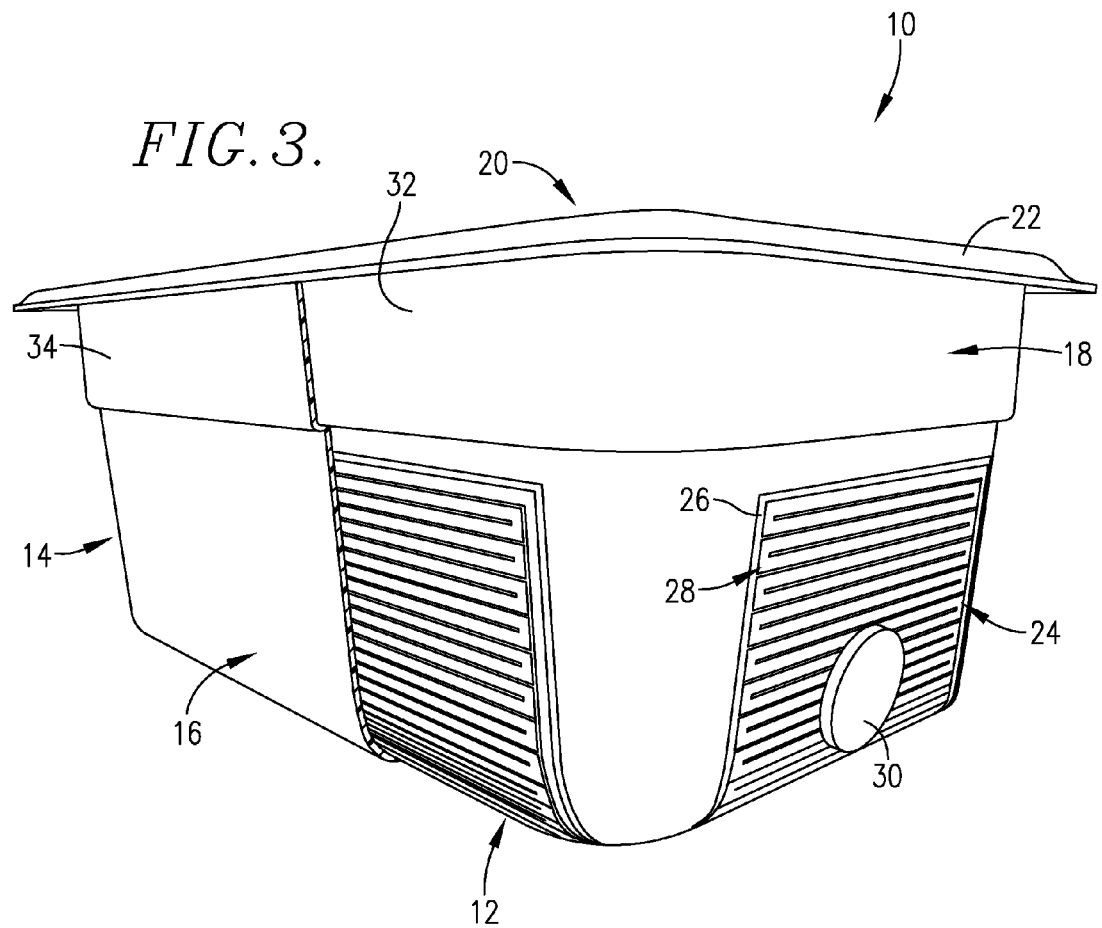

INDUCTION HEATING SYSTEM EMPLOYING INDUCTION-HEATED SWITCHED-CIRCUIT VESSELS

CROSS-REFERENCE TO RELATED APPLICATION

This application claims the benefit of provisional application entitled INDUCTION HEATING SYSTEM EMPLOYING INDUCTION-HEATED SWITCHED-CIRCUIT VESSELS Ser. No. 61/572,265, filed Jul. 14, 2011, and a second provisional application entitled INDUCTION HEATING SYSTEM EMPLOYING INDUCTION-HEATED SWITCHED-CIRCUIT VESSELS WITH EDDY CURRENT THERMOMETER TEMPERATURE CONTROL, Ser. No. 61/690,511, filed Jun. 28, 2012, both incorporated herein by reference in their entireties.

BACKGROUND OF THE INVENTION

1. Field of the Invention

The present invention is broadly concerned with improved induction heatable articles, such as food-heating pans, which are designed to permit differential magnetic induction Joule heating of respective portions of the articles. More particularly, the invention is concerned with such articles, induction heating assemblies making use of the articles, and corresponding methods. Preferably, the induction heatable articles are formed of synthetic resin material and include one or more susceptor coils having a plurality of zones each adjacent a different portion of the articles and capable of providing respective, different levels of Joule heating to the different portions under the influence of an applied alternating magnetic induction field. In another aspect of the invention, a highly energy efficient, induction heated food heating/warming table is provided with various sizes of pans which can be individually and differentially heated at user-selected temperature levels.

2. Description of the Prior Art

Vessels and pans have been provided in the past with surface walls actively maintained at desired temperatures so as to maintain the contents of the vessels or pans at desired temperature levels. For example, water tanks for brewing coffee typically employ a resistive heating element wrapped around an upright cylindrical stainless steel tank wall, and also have a similar element adjacent the bottom wall of the tank. Electrical current flowing through the resistive elements heat the latter, with temperature regulation being provided via temperature feedback using a thermal sensor attached to an outer tank wall or disposed in the water.

In addition, food pans employed in steam wells for food service applications, whether stainless steel or of polymer construction, are heated by steam on all four sides and the bottom thereof so as to maintain food therein at desired, safe temperatures. The steam generator system of the well may be regulated by temperature feedback from one or more temperature sensors in the well. Steam wells are capable of maintaining all surfaces of a pan in the well at nearly the same temperature because the steam contacts all pan surfaces and condenses on the surfaces as a function of the temperature of that surface area. In essence, with steam heating, each unit surface area of the pans acts as its own thermal sensor for feedback to the steam heat source.

However, conventional steam tables suffer from a number of deficiencies. First, these units require considerable energy inputs to create and maintain the heating steam. This energy inefficiency is compounded because of the fact that the HVAC systems of the buildings housing the steam tables must be operated to counteract the heat and humidity generated by the steam tables. Furthermore, the steam tables containing warm/hot water can be contaminated with undesirable microorganisms which can in turn contaminate the food being served.

Vessels or pans heated by induced current on multiple surface walls are also known in the prior art. For example, U.S. Pat. No. 5,954,984 discloses vessels employing wrapped coil heating elements which are heated by Joule heating of the coil elements via induction heating using a work coil. An induction heater with an impedance detection capability is used to trigger the magnetic field on and off in response to the load (i.e., the vessel) impedance which is itself a function of the state of an associated temperature switch. Further, U.S. Pat. No. 6,504,135 describes induction heatable coil heating elements with a switchable element, such as a thermal switch, allowing the coil element to interact with the induction heating system described in the '984 patent.

CookTek Induction Systems, LLC of Chicago, Ill., has commercialized a waterless food heating/warming table system (referred to as the "SinAqua" system) wherein stainless steel pans are induction heated. However, there is no means of differentially heating different portions of the stainless steel food-holding pans, i.e., the entirety of the pans is heated by appropriately positioned induction work coils.

Thus, while induction heating of pans is well known, a number of problems remain. Most importantly, prior induction heating systems have not provided effective means for differentially heating respective portions of a pan or vessel to different temperatures or over different time periods. This is especially the case in connection with food heating/warming table systems having different and differently sized pans holding different kinds of foods. Optimally, such pans should be individually heated with, for example, the principal heating through the bottom walls of the pans, while also providing secondary heating around the sides and ends of the pans.

SUMMARY OF THE INVENTION

The present invention overcomes the problems outlined above and provides an induction heatable article which can be differentially Joule heated under the influence of an alternating magnetic induction field. Generally speaking, the article includes a body formed of a synthetic resin material and presenting a bottom and sidewall structure extending upwardly from the bottom. At least one induction heatable susceptor coil secured to the body and is operable, under the influence of an applied alternating magnetic field, to generate Joule heating within the coil to thereby heat the body. Importantly, the susceptor coil has a plurality of zones each adjacent a different portion of the body and capable of providing respective, different levels of Joule heating to the different portions of the body under the influence of the applied alternating magnetic field. In preferred forms, the body is a food-heating pan having a bottom wall and sidewall structure extending upwardly from said bottom wall, the inner surfaces of the bottom wall and sidewall structure cooperatively defining a food-holding cavity.

Advantageously, the susceptor coil zones each compromise a plurality of electrically conductive traces operable to generate Joule heating therein under the influence of the alternating magnetic field. The traces of the different zones are operable to provide different levels of Joule heating by generating different magnitudes of Joule heating-derived energy in the traces per unit time and/or by generating Joule heating therein over different time periods. For example, the traces of one of the zones of the susceptor coil may have a cross-sectional area different than the traces of another of the zones, whereby the traces of the one zone generate a different magnitude of Joule heating-derived energy per unit time than the traces of the other zone. Thus, the traces of the one susceptor coil zone may have a greater width and/or height, as compared with the traces of the other susceptor coil zone. Another manner of creating differentially Joule heated zones involves fabricating the traces of one of the zones using a conductive material having a given electrical resistivity, whereas one or more of the other zones are fabricated using material having an electrical resistivity different than that of the one zone. In this manner, the traces of the one zone generate a different magnitude of Joule heating-derived energy per unit time than the traces of other zone(s).

In preferred forms, at least one selectively operable thermal switch is coupled with the susceptor coil and is operable to alter the time period during which Joule heating is generated in one of the zones, as compared with the time period during which Joule heating is generated in another of the zones. For example, the thermal switch may be operable when the susceptor coil reaches a predetermined temperature. Of course, a plurality of such thermal switches may also be used.

Food-heating pans in accordance with the invention are preferably formed of conventional polysulfone material, with the susceptor coil(s) embedded within pan body. For example, different susceptor coil zones can be embedded within the bottom wall of the pan in the sidewall structure thereof, respectively. In order to provide a fail-safe pan, it is preferred to include a thermal fuse in operative contact with the susceptor coil which is fusable to terminate Joule heating of the susceptor coil in the event that the fuse experiences a preselected cut out temperature.

Temperature control of the induction heatable articles of the invention may be provided by means of known impedance detection techniques, such as those described in U.S. Pat. Nos. 6,504,135 and 5,954,984, both incorporated by reference herein in their entireties. Additionally, temperature control may be achieved through the use of an improved eddy current thermometer of the type described in U.S. Patent Publication No. 2011/0090937, also incorporated by reference herein in its entirety. In the latter case, the susceptor coil of the article is equipped with an appropriately sized metallic conductor which electromagnetically couples with an eddy current thermometer system including a field transmitting coil and a field receiving coil assembly.

An induction heating assembly in accordance with the invention includes a single, substantially planar induction heating work coil operable to create an alternating magnetic induction field, together with a non-planar induction heatable article positioned over the work coil for heating of the article, to include article surfaces not in or parallel to the plane of the work coil. The article in turn comprises a body formed of heatable synthetic material of the type described above, having at least one susceptor coil, which magnetically couples with the work coil for differential heating of the article.

In another aspect of the invention, a modular food heating system is provided including a base supporting a plurality of spaced apart, independently operable induction work coils arranged in a predetermined array, each of the work coils operable to independently create an alternating magnetic field. The overall system also has a plurality of synthetic resin, food-holding, induction heatable pans each positionable on the base for induction heating thereof and the food held therein. Each of the pans is of the type previously described, and is sized to overlie a predetermined number of the work coils in the array thereof, with each pan including the predetermined number of induction heatable susceptor coils located such that each susceptor coil overlies a corresponding one of the work coils, when the pan is positioned on said base. Each of the susceptor coils is operable, under the influence of the alternating magnetic field created by the corresponding work coil, to generate Joule heating within the susceptor coil to thereby heat the associated pan and the food therein. Apparatus is also provided to selectively and independently operate each of the work coils, preferably so as to independently control the temperature of each of the food-holding pans (or a portion of the food holding pan whose susceptor coil covers said portion of the pan) using impedance load detection and/or eddy current thermometer strategies. Advantageously, a user input interface is provided allowing such individual temperature control for each of the pans (or each portion of a pan whose associated susceptor coil covers a portion of a pan having multiple susceptor coils).

The invention also comprehends a method of heating an induction heatable article having a bottom wall and a sidewall structure extending upwardly from the bottom wall by placing the bottom wall of said article over a substantially planar induction heating work coil. The work coil is then energized in order to create an alternating magnetic field, serving to heat said article by virtue of Joule heating generated within the article, while varying the extent of said Joule heating of the article at different portions of the article such that one portion of the article is Joule heated to a greater extent than another portion of the article. Again, the article is preferably a food-heating pan of the type described above, equipped with a zoned susceptor coil providing respective, different levels of Joule heating to different portions of the pan.

The invention further provides an induction heatable article comprising a body formed of a synthetic resin material and presenting a bottom and a sidewall structure extending upwardly from the bottom. At least one induction heatable susceptor coil secured to the body and is operable, under the influence of an alternating magnetic field, to generate Joule heating within the coil to thereby heat the body. A metallic, Eddy Current Thermometer sensor, such as a thin metallic disk, is operably coupled with the susceptor coil and may be electromagnetically coupled with an eddy current thermometer of the type described in the aforementioned patent publication.

The susceptor coil likewise has a plurality of zones each adjacent a different portion of the body and capable of providing respective, different levels of Joule heating to the different portions of the body under the influence of the applied alternating magnetic field, all as described above.

BRIEF DESCRIPTION OF THE DRAWINGS

FIG. 1 is a plan view of a food warming table in accordance with the invention, shown with differently sized food-holding pans situated above an array of induction heating work coils;

FIG. 2 is a bottom view of the table illustrated in FIG. 1, schematically depicting the respective work coils and the associated electronic controls for the work coils;

FIG. 3 is a perspective view in partial vertical section of an induction heatable food pan in accordance with the invention, equipped with a multiple-zone, induction heatable, susceptor coil;

FIG. 5 is a schematic sectional view illustrating the difference in height between respective conductive traces forming a part of the coil illustrated in FIG. 4;

DETAILED DESCRIPTION OF THE PREFERRED EMBODIMENTS

Figure 4:
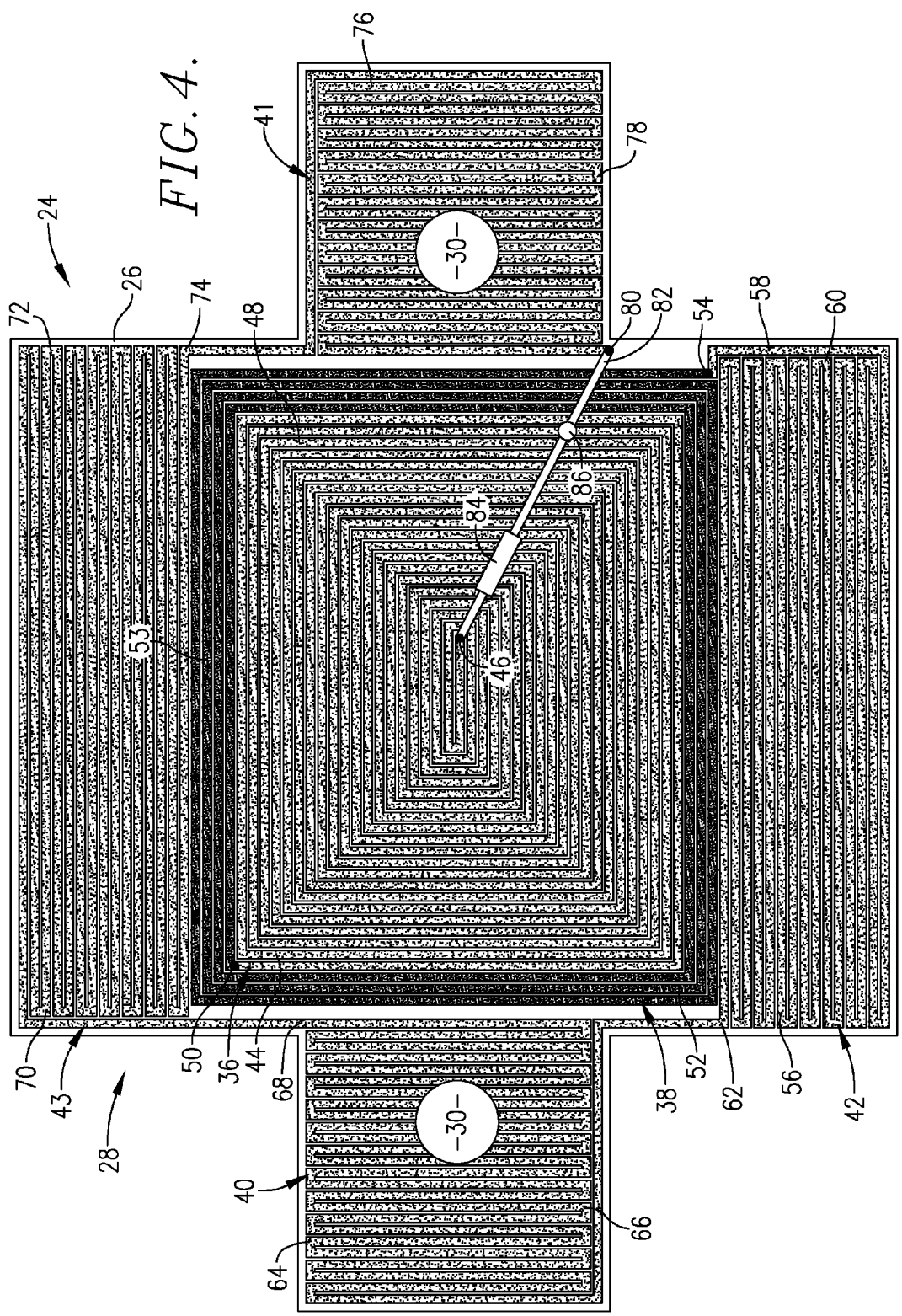
FIG. 4 is a plan view of a multiple-zone susceptor coil designed for application to a synthetic resin food-holding pan of the type depicted in FIG. 3.

Referring first to FIG. 3, a food-holding pan 10 in accordance with the invention is illustrated. The pan 10 is of the standard configuration and dimensions of a one-quarter size pan commonly used in the commercial food industry, and has a bottom wall 12, sidewall structure 14 including opposed sidewalls 16 and opposed end walls 18. The inner surfaces of the walls 12, 16, and 18 cooperatively define a food-holding cavity 20. A continuous, peripheral, outwardly extending lip 22 is provided at the upper edge of the pan 10. The pan 10 is also equipped with an embedded, multiple-zone susceptor coil 24 including a synthetic resin (e.g., Mylar® or Kapton®) base sheet 26 having a series of electrically conductive traces broadly referred to by the numeral 28 applied to the outer face of the sheet 26. Additionally, the portions of the coil 24 at the end walls 18 have metallic temperature sensing disks 30 which are important for purposes to be described.

The pan 10 is formed of an appropriate synthetic resin material, typically a polysulfone material. In the embodiment illustrated in FIG. 3, the pan 10 is made up of an inner shell 32 with the base sheet of susceptor coil 24 adhesively or otherwise adhered to the outer surface thereof, together with an outer shell 34 which mates with inner shell 32 to form the complete pan 10. Of course, the susceptor coil 24 and disks 30 are thereby effectively embedded within the structure of pan 10 and are sandwiched between the inner and outer shells 32, 34. In the FIG. 3 construction, the inner shell 32 is first molded and the sheet 26 is adhered to the outer surface thereof. Next, the outer shell 34 is overmolded to the inner shell 32 to create a unitary structure with the coil 24 and disks 30 embedded therein to create a unitary design. The outer shell overmold material may be formed employing the same polymer used for the inner shell 32, or it may alternately be a blown plastic material giving enhanced thermal insulation.

Alternately, the inner and outer shells 32, 34 may be separately molded so as to provide a space therebetween sufficient to accommodate the susceptor coil 24 and disks 30. The latter components are then attached to the inner shell 32, and the inner and outer shells are interconnected by any known means, such as by ultrasonic welding or adhesives. Normally, the remainder of the open space between the inner and outer shells is filled with high-temperature foam insulation, e.g., polyurethane or silicone. The foam insulation is preferably of the closed cell type that can be injected under pressure into the free space between the shells 32, 34 so that the pan 10 is waterproof and dishwasher-safe. As explained, the illustrated pan 10 is a one-quarter size pan. Other pan sizes and configurations can also be provided, such as one-half size pans 10a and full-size pans 10b (FIG. 1), or for that matter any desired pan shape or size. The preferred pans of the invention are provided with one or more susceptor coils, such as those described in detail below.

Embodiment 1 (FIG. 4)—Susceptor Coil Having Multiple Joule Heating Zones Providing Variable Watt Density Joule Heating Owing to Variable Trace Thicknesses, a Single Thermal Switch, and Thin Disk Eddy Current Thermometer Sensors The susceptor coil 24 of FIG. 4 includes a thin synthetic resin base sheet 26 having the traces 28 printed on the upper face thereof. In the illustrated embodiment, the traces 28 are continuous and formed of copper, but other electrically conductive materials such as silver or carbon ink may also be used. This embodiment primarily relies upon variations in trace thickness to give the desired variable Watt density Joule heating of the coil 24 and hence the pan 10.

Referring in detail to FIG. 4, the coil 24 has a central zone 36, which when applied is adjacent bottom wall 12 of pan 10; a peripheral zone 38 surrounding the zone 36 and which when applied is adjacent the edge or transition between bottom wall 12 and sidewall structure 14; opposed end wall zones 40 and 41, which are spaced from the peripheral zone 38 and which when applied are adjacent the pan end walls 18; and opposed sidewall zones 42 and 43, which extend outwardly from peripheral zone 38 and which when applied are adjacent the pan sidewalls 16.

The traces 44 of zone 36 are 0.1 inch wide and 0.001 inch thick. Beginning at point 46 near the center of zone 36, the traces 44 extend from right to left and then bends upwardly and rightwardly to form a nested group of closely spaced apart trace rectangles 48 terminating at point 50. At point 50 the traces 44 interconnect with the traces 52 of zone 38, the latter having the same width as traces 44, but with a thickness double that of the traces 44, i.e., the traces 52 are 0.1 inch wide and 0.002 inches thick. Such additional thickness is formed by overprinting these traces. The peripheral zone 38 provides a nested grouping of four trace rectangles 53, and terminates at point 54.

The electrically interconnected, outwardly extending zones 40-43 each have the same basic trace design, using traces having the same dimensions as traces 44 of zone 36, and formed as respective series of interconnected serpentine sections.

In detail, at point 54 the traces 52 interconnect with the traces 56 of zone 42, and include an outwardly extending connection leg 58 and a series of adjacent, juxtaposed serpentine sections 60 terminating at point 62. At point 62, the traces 52 interconnect with the traces 64 of zone 40, to form a series of serpentine sections 66 terminating at point 68. At point 68, the traces 64 interconnect with traces 70 of zone 43 to form serpentine sections 72, terminating at point 74. Finally, at point 74, the traces 70 interconnect with traces 76 of zone 41, forming serpentine sections 78 and terminating at the coil terminus point 80.

In order to complete the heating path of coil 24 and thereby allowing induced circulating current to pass through the coil, an electrical connection must be made between the points 46 and 80. This connection is preferably made via a separate trace 82 having the same dimensions and formed of the same material as traces 44, 56, 64, 70, and 76, but is electrically isolated from all of the traces 44, 52, 56, 64, 70, and 76 except at the connecting points 46 and 80.

A thermal switch 84 and a thermal fuse 86 are provided in trace 82. The preferred thermal switch 84 is a creep-action bi-metallic switch such as a Model B thermostat/thermal protector commercialized by Portage Electrical Products, Inc., having a shunted bimetal construction allowing high contact ratings for at least 100,000 cycles. Of course, other types of switches, including electronic switches, may be used in this context. However, the Model B switch has a low hysteresis such that the temperature at which the switch's contacts open is within a few degrees C. of the temperature at which the switch's contacts close. In this design, the switch 84 is an open-on-rise switch that opens at 212° F. As illustrated, the body of the switch 84 is placed in thermal contact with multiple traces of zone 36.

The thermal fuse 86 (also referred to as a thermal cutout) is provided along the conducting path of trace 82, and is preferably a Model DF 260S thermal cutout commercialized by Cantherm Corporation. The fuse 86 is designed to open permanently when its temperature exceeds a predetermined level. In this design, the fuse 86 is adhered and is in good thermal contact with several traces of zone 36 so that, should this portion of the susceptor coil 24 (and thus the bottom of pan 10) exceed the thermal limit of the fuse (in this case, 260° F.), the fuse will permanently open to prevent any further Joule heating of the coil 24.

The disks 30 are preferably constructed of pure copper sheet of 0.080 inch thickness and have a diameter of one inch. The disks are electrically isolated from the traces 64 and 76 of zones 40 and 41, but are in direct thermal contact with those traces. The disks are a part of an optional sensing assembly making use of an improved eddy current thermometer described in the aforementioned Patent Publication 2011/0090937.

The variation in thickness between the traces 44, 52, and 64 of zones 36, 38, and 40 is illustrated in FIG. 5. Thus, the width of all of the traces is identical, but the traces 52 have a thickness twice that of the traces 44 and 64. Accordingly, the electrical resistance per unit length of the trace 52 is twice that of the traces 44 and 64.

Operation

Figure 8:
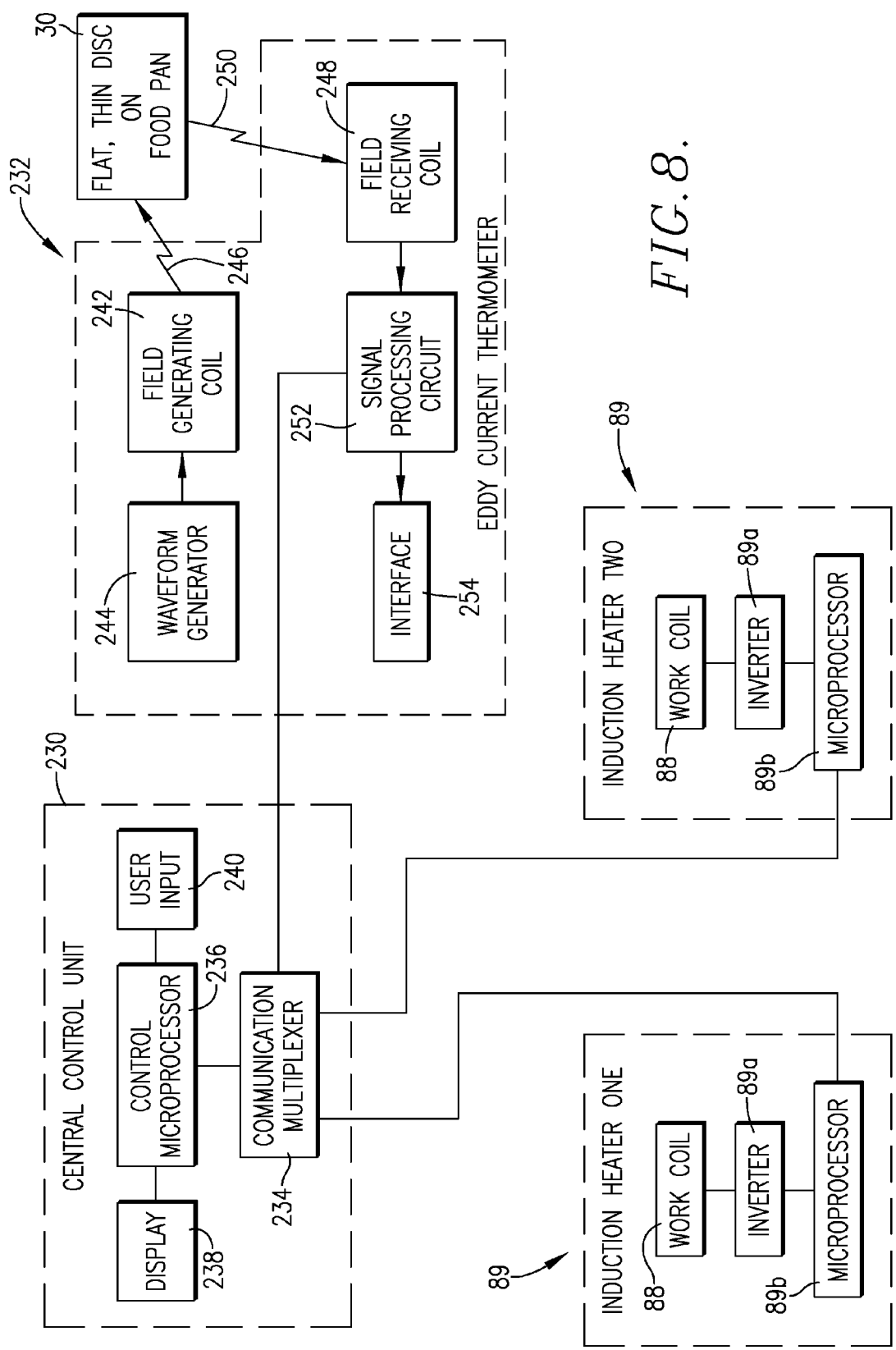
FIG. 8 is a schematic view illustrating the control apparatus forming a part of the table illustrated in FIGS. 1 and 2, showing the interconnection of the respective work coil operating electronics and a master digital processor.

When pan 10 equipped with susceptor coil 24 is placed over the induction work coil 88 of an induction heater 89, as illustrated in FIGS. 1 and 8, and the work coil 88 is appropriately energized to create an alternating magnetic field, the coil 24 and thus pan 10 is heated. The induction heater 89 includes, in addition to the work coil 88, inverter circuitry 89a and microprocessor 89b.

The heating of coil 24 and pan 10 employs two mechanisms: The first and primary mechanism is the Joule heating which results from the induced circulating current which travels along the full path of the coil 24, providing equal current to all of the zones 36-43. The second mechanism is the secondary Joule heating arising from eddy currents formed within the traces of the coil 24. However, these eddy currents are formed substantially only within the trace area of zone 36 directly above the work coil, i.e., where the magnetic flux directly penetrates the trace area. Even if the pan 10 is placed in an offset relationship relative to the work coil so that some of the traces 52 of zone 38 are directly over the work coil, the configuration of the traces 52 results in substantially less eddy current heating thereof, as compared with the traces 44 of zone 36.

During this induction heating of the pan 10, the zones 36 and 40-43 are Joule heated via the circulating current to the same extent, i.e., the rate of Joule heating-derived energy due to induced circulating currents within each of these zones is the same. However, the zone 38 is Joule heated via the induced circulating current at a rate which is 50% less than that of zones 36 and 40-43. This arises because of the differential height of the traces 52 of zone 38 as compared with the other traces 44, 56, 64, 70, and 76. Consequently, the pan 10 is differentially heated at the corresponding portions thereof adjacent the traces.

Temperature control during normal induction heating of pan 10 is provided by virtue of the presence of the disks 30, and the corresponding use of an eddy current thermometer of the type described in Patent Publication 2011/0090937. Broadly, the disks 30 are subjected to an alternating magnetic field produced by the field transmitting coil of the eddy current thermometer reader. This magnetic field induces eddy currents within the disks 30 which are detected and decoded to determine the temperatures of the disks, and thus the temperatures of the corresponding locations on the coil 24. The eddy current thermometer reader is in electronic communication with the driver components of work coil 88, so that the temperatures that the thermometer reader determines from the disks 30 is used as feedback information to control the power output of the work coil 88; this in turn provides a means of controlling the temperature of coil 24 and vessel 10 within a preselected temperature range. The preferred eddy current thermometer and details of operation thereof are described below in connection with the operation of the food warming table depicted in FIGS. 1-2.

As the pan 10 is heated and reaches the predetermined operational temperature of switch 84 (owing to failure of the eddy current temperature control or for some other reason), the switch opens to thereby prevent further passage of circulating current within the coil 24. Furthermore, the induction heater detects a "no load" condition which causes its work coil to cease continuous production of the alternating magnetic field. Hence, no further Joule heating of the pan 10 occurs. Thereafter, as the pan 10 cools, the switch 84 recloses to again permit Joule heating of the coil 24. At this point, temperature control of the pan 10 is again provided by virtue of the presence of the disks 30, and the corresponding use of an eddy current thermometer of the type described in Patent Publication 2011/0090937. This open/close operation of the switch 84 may continue to thereby effectively prevent the pan temperature from exceeding the operating temperature of the switch 84.

The fuse 86 provides a further backup mechanism is the event of untoward high temperatures is experienced by coil 24 and pan 10, significantly above the operational temperature of switch 84. In this case the fuse operates to terminate any further passage of circulating current within the coil 24, and the pan 10 is rendered inoperable for controlled induction heating until the fuse 86 is replaced. Typically, the pan 10 would be discarded in the event of operation of the fuse 86. If the work coil 88 continued to operate after the switch 84 opens or fuse 86 operates, the bottom zone 36, and to a lesser extent the peripheral zone 38, would still experience some heating due to induced eddy currents. In practice however, such eddy current heating is negligible because the load detection system associated with the work coil 88 will shut down the work coil except for periodic test pulses of the magnetic field, as described in U.S. Pat. No. 6,504,135.

Specifically, the previously described inverter circuitry 89a has a resonant circuit including work coil 88, which is a primary with respect to a secondary sensing coil, and a detection circuit coupled with the secondary sensing coil (not shown, but depicted in FIG. 18 of U.S. Pat. No. 6,504,135). This provides a "no-load detector" which is conventionally provided with induction heaters. The sensing coil of the inverter circuitry 89a is operable to detect the impedance of the external load presented by the coil 24 to the resonant circuit, and allows measurement of an appropriate feedback parameter related to such impedance. In practice, the amplitude of the resonant circuit current, $I_{rc}$, is determined by measuring the amplitude of current that has been induced in a detection circuit forming a part of the inverter circuitry 89a during heating operations. When the switch 84 opens, the current through the work coil 88 is interrupted. Thereafter, the work coil 88 is energized only periodically to create test pulses of the alternating magnetic field to determine when switch 84 closes in order to resume current flow through work coil 88.

Figure 6:
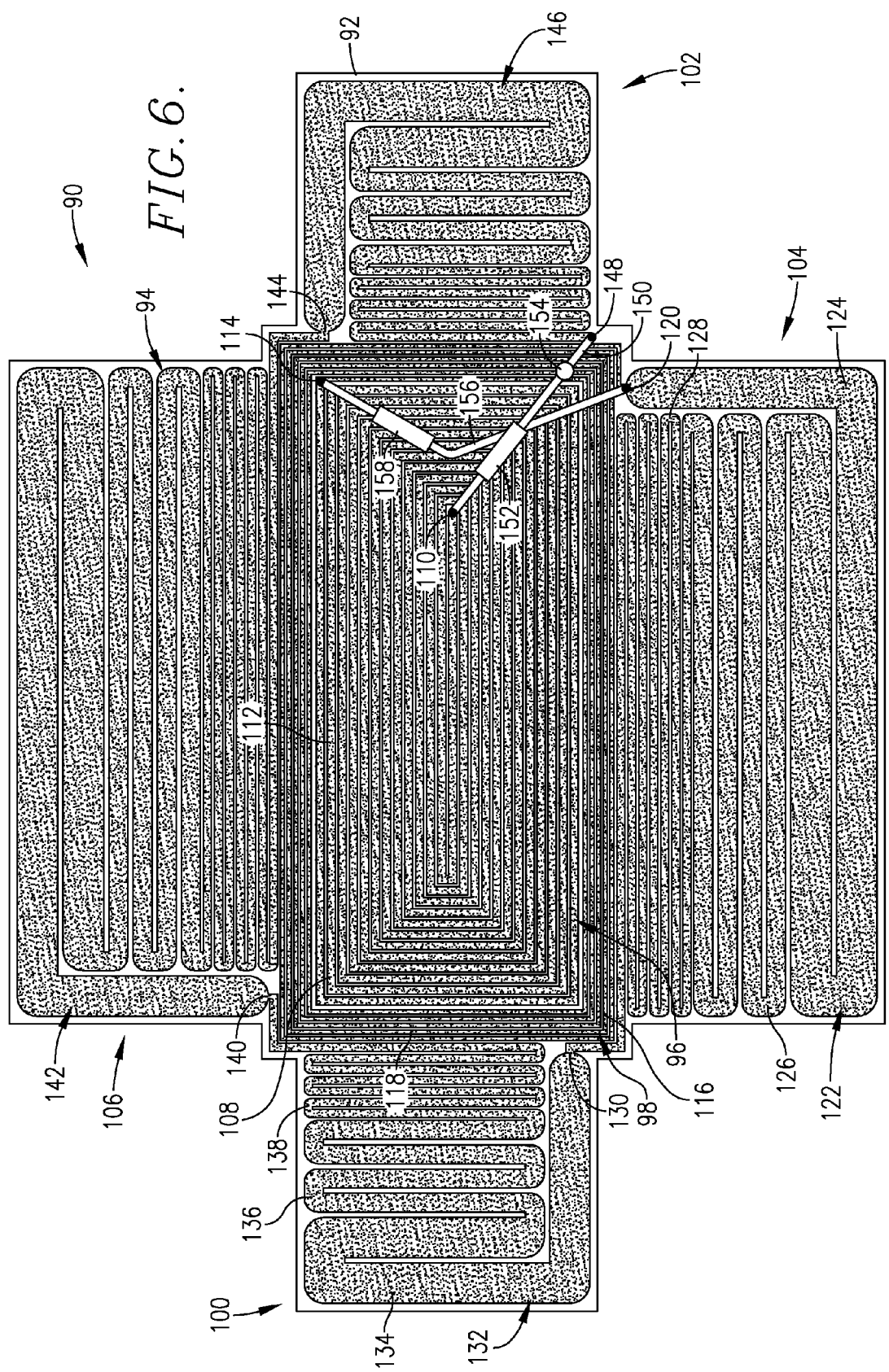
FIG. 6 is an enlarged, fragmentary view depicting portions of another multiple-zone susceptor coil, and illustrating the difference in width between the electrically conductive traces of three of the zones.

Embodiment 2 (FIG. 6)—Susceptor Coil Having Multiple Joule Heating Zones Providing Variable Watt Density Joule Heating Owing to Variable Trace Widths and Multiple Thermal Switches FIG. 6 depicts another susceptor coil 90 also intended for use on a one-quarter size pan of the type illustrated in FIG. 3. Again, the coil 90 comprises a thin synthetic resin backing sheet 92 and a series of traces imprinted thereon broadly referred to by the numeral 94. As in the case of coil 24, the coil 90 presents a series of zones having different Joule heating characteristics, namely: a bottom zone 96 for application to the bottom wall 12 of pan 10; a peripheral zone 98 surrounding the zone 96 for application adjacent the edge or transition between bottom wall 12 and sidewall structure 14 of pan 10; opposed, outwardly extending end wall zones 100 and 102 for application to the end walls 18 of pan 10; and opposed, outwardly extending sidewall zones 104, 106 for application to the sidewalls 16 of pan 10.

In more detail, the zone 96 is made up of traces 108, which are 0.1 inch wide and 0.001 inch in thickness. Beginning at point 110, the traces extend from right to left and then bend upwardly and rightwardly to form a nested group of rectangles 112. The traces 108 continue to point 114, where the traces 108 interconnect with traces 116 of peripheral zone 98. The traces 116 likewise form a series of nested rectangles 118 and terminate at point 120. It is to be noted that the traces 116 have a width less than that of the traces 108 of zone 96. Thus, the total electrical resistance of the traces comprising zone 98 is at least 20% of the total electrical resistance of the entire coil 90. Moreover, the narrowness of the traces 98 as compared with traces 108 serves to equalize the heating rate of the bottom 12 of pan 10 during induction heating thereof, as will be described below.

The traces 122 of zone 104 are connected to the end of the traces 116 at point 120, and have variable widths in segments 124, 126, and 128. Specifically, the widest trace segment 124 extends from point 120 and is serpentine in form, leading to the intermediate segment 126, which is narrower in width as compared with the segment 124, and is also serpentine in configuration. Finally, the narrowest width segment 128 extends from the segment 126 and terminates at point 130. The traces 132 of zone 100 interconnect with the traces 122 at point 130, and likewise have variable width segments, namely widest serpentine segment 134, intermediate segment 136 of lesser width than segment 134, and narrowest segment 138, which terminates at point 140.

The traces 142 of zone 106 are identical with and a mirror image of the traces 122 of zone 104, and thus need not be described, save to note that the traces 142 terminate at point 144. In like manner, the traces 146 of end zone 102 are identical with a mirror image of the traces 132 of opposed end zone 100, and thus require no further description. The traces 146 terminate at point 148.

In order to complete the heating path for coil 90, a trace 150 extends from points 110 to 148, and is electrically isolated from all of the other traces, except at the connecting points 110, 148. The trace 150 also includes at least one thermal switch 152, which is preferably the Model B thermostat/thermal protector described previously. The body of switch 152 is in thermal contact with the traces 108 of zone 96, such that, when those traces and thereby the bottom wall surface of pan 10 reaches 212° F., the switch 152 will open to terminate the circulating currents induced within coil 90. The trace 150 also includes a thermal fuse 154, which is preferably the Model DF 260S described above.

Another trace 156 extends between and is connected at the points 114 and 120. As before, the trace 156 is electrically isolated from all other traces of coil 94 except at the connecting points 114, 120. The trace 156 is equipped with a second thermal switch 158, which is again preferably the described Model B thermostat/thermal protector. In this case, however, the thermal switch is designed to open at 175° F., as compared with the 212° F. open temperature for the switch 152. Hence, the switch 152 may be deemed a high threshold switch, whereas the switch 158 is a low threshold switch.

Operation

During operation of a pan equipped with coil 90, the pan is placed over a work coil 88 as viewed in FIG. 1 and the latter is energized to create an alternating magnetic induction field, which couples with the coil 90. Zone 96 is the primary energy transfer region of the coil 90, and is sized larger than the corresponding induction work coil 88. Zone 96 also acts as the main portion of the secondary of a transformer comprising the susceptor coil 90 and work coil 88.

The traces 116 of zone 98 have a lesser width than the traces 108 of bottom zone 96. In this manner, the total resistance of the traces making up zone 98 is at least 20% of the total resistance of the entire susceptor coil 90. Moreover, the narrowness of the traces 116 in comparison to the traces 108 serves another purpose, i.e., to equalize the heating rate of the bottom 12 of pan 10 during heating. As in the case of the first embodiment, two energy transfer mechanisms are at work. When the bottom 12 of the pan 10 is properly located relative to and magnetically coupled with a work coil 88. The greater of these two mechanisms is the Joule heating that results from the induced circulating current travelling along the full path of the coil 90, where the current magnitude is constant at all points in the coil 90. The second energy transfer mechanism is Joule heating resulting from eddy currents formed with the various traces of the coil 90. These eddy currents are formed only within the trace area placed directly over the work coil 88 where magnetic flux directly penetrates the traces. Because the work coil 88 is sized to be significantly smaller than bottom zone 96 of coil 90, when the pan 10 is placed over the work coil 88, the majority of the eddy currents will form in zone 96. Since eddy currents formed in the same material (i.e., zones 96 and 98 are preferentially formed of the same electrically conductive material), and from the same alternating magnetic field emanating from work coil 88, the traces 108 of zone 96 will usually be the only traces subjected to Joule heating by induced eddy currents. However, if the pan 10 is placed in an offset relationship relative to coil 88 so that some of the traces 116 of zone 98 are directly above the coil 88, the relatively narrow traces 116 will receive substantially less eddy current heating than the traces 108 of zone 96. Given that the wider traces 108 of zone 96 experience two mechanisms of Joule heating (induced circulating currents and induced eddy currents), while the narrower traces 116 of zone 98 experience Joule heating almost exclusively from the circulating current, the design of the traces of zones 96 and 98 equalizes the heating rate experience over the total area of the bottom wall 12 of pan 10 during induction heating of the latter. That is, the narrower traces 116 of zone 98 experience a greater electrical resistance per unit length, as compared with the wider traces 108 of zone 96.

Sidewall zone 104 is the portion of coil 90 that extends upwardly and covers the vertical surface of one of the opposed sidewalls 16, and likewise the zone 106 covers the vertical surface of the other sidewall 16. The zones 104 and 106 have traces of varying width, namely the segments 124-128, and are designed to vary the heating rates of the overall surface areas of the sidewalls 16. Inasmuch as the polymer pan inner surface is an imperfect thermal conductor, it is preferred that the heating rate provided by the traces 122 of the zones 104 and 106 be relatively higher near the bottom wall 12 and lower near the outwardly extending lip 22 at the upper edge of the pan 10 to correspond to the variable cooling load that may exist for the corresponding polymer surfaces. For instance, when food is placed within the polymer pan 10 for induction heating so as to maintain the temperature within the food pan above safe levels at a desired temperature, the bottom of the pan (covered by zones 96 and 98 of coil 90) will typically be covered with at least some portion of the food. However, the sidewalls 16 covered by the zones 104 and 106 may have varying amounts of food in contact therewith throughout the heating cycle, as the food is removed for consumption or added for maintenance. Thus, varying cooling loads will be experienced by the sidewalls adjacent the coil zones 104 and 106. Since on average the portions of the sidewalls 18 nearest the bottom wall 12 of the pan 10 will experience more of a cooling load, the widths of the traces 116 making up segment 128 are smaller as compared with the traces of intermediate and upper segments 124 and 126.

Coil zones 100 and 102, which are wrapped up from the pan bottom and in contact with the end walls 18, are designed in a similar fashion as compared with zones 104 and 106, i.e., the traces of segments 138 are narrower than the intermediate and uppermost segments 136 and 134. This provides the same type of differential heating of the end walls 18.

The switch 152 is an open-on-rise switch designed to open at 212° F. and has a low hysteresis, such that the switch will reclose a few degrees below 212° F. Thus, when the adjacent pan surface exceeds 212° F., the switch 152 will open to prevent formation of any circulating currents in the coil 90 via coupled induction heating. Of course, if the coil 88 is producing a magnetic field and the pan is placed in a closely coupled position with zone 96 directly above work coil 88, zones 96, and to a lesser extent zone 98, can still experience some heating owing to induced eddy current heating, even if the switch 152 is open. However, such heating will be negligible because the induction heater's load detection system will prevent anything other than test pulses of the magnetic field to be produced when the thermal switch 152 is open, as previously described in connection with Embodiment 1. The switch 152 is hereafter referred to as the high threshold switch.

The conducting trace 156 performs two important functions. First, it allows for user-selected hold temperatures; and second, it extends the life of the pan by reducing the number of thermal switch cycles experienced by the switches 152 and 158 per hour of pan operation. Specifically, the trace 156 includes thermal switch 158, which is similar to the switch 152, but has a close-on-rise switch temperature of 175° F. In this manner, when the adjacent traces 108 of zone 96 exceed 175° F., switch 158 will close and thus electrically connect zones 96 and 104, bypassing zone 98 so that the effective resistance of the coil 90 is reduced by at least 20%. This sudden reduction of coil heating element resistance can be detected by the previously described load detection system. The switch 158 is therefore referred to as the low threshold switch.

During the time that switch 158 is closed, the traces 116 of zone 98 will no longer experience Joule heating due to circulating current, because no circulating current will pass through the traces 116 until thermal switch 158 reopens. Furthermore, if the pan 10 is properly centered over the work coil 88, no Joule heating due to eddy current formation within traces 116 will occur. Because the surface area of the pan bottom covered by the traces 116 of zone 98 is small, the food within pan 10 will nevertheless by maintained at substantially uniform temperatures.

Embodiment 3 (FIG. 7)—Double Module Susceptor Coil for One-half Size Pan

Figure 7:
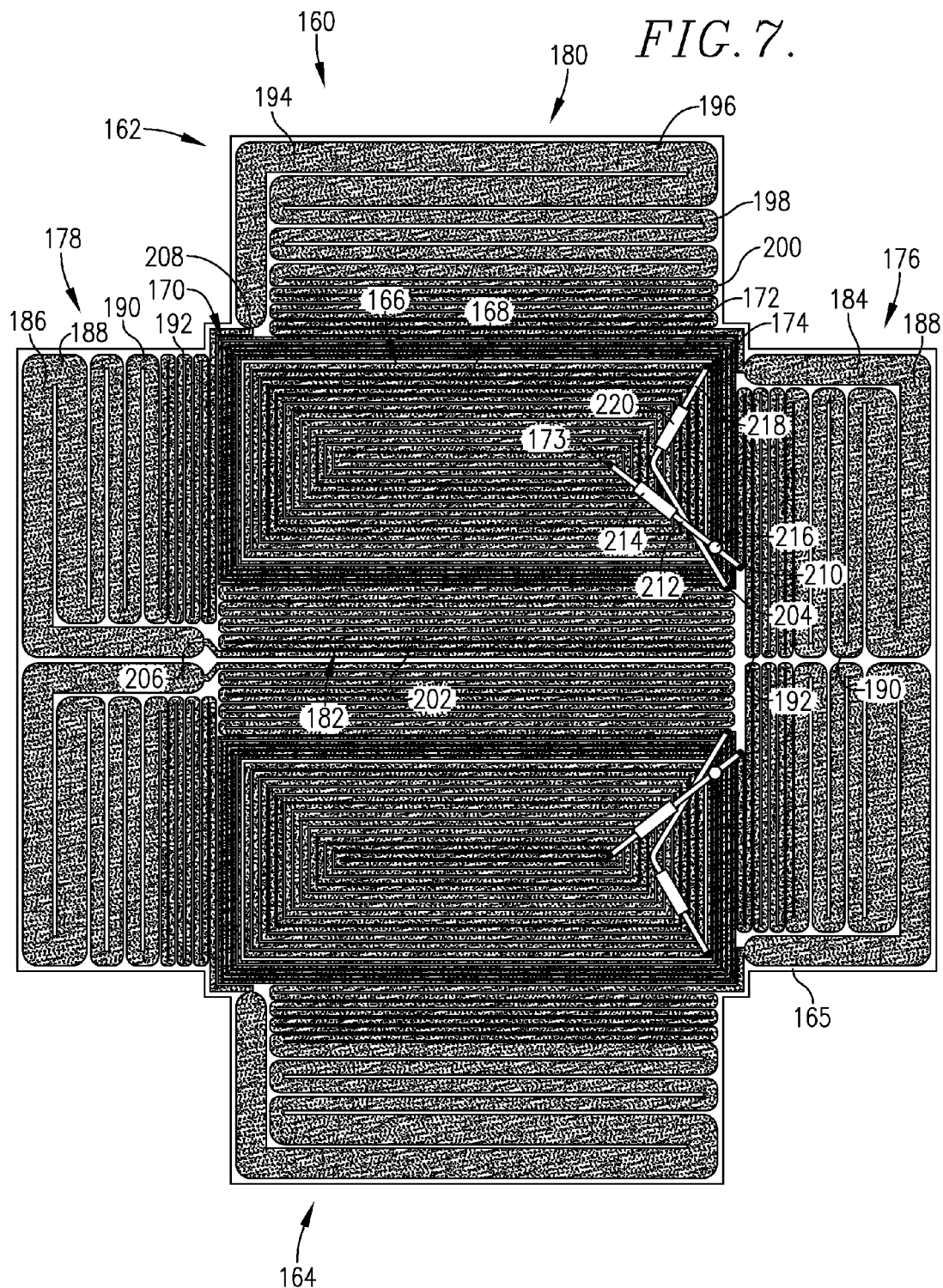
FIG. 7 is a plan view of another multiple-zone susceptor coil assembly made up of two adjacent susceptor coils.

FIG. 7 illustrates a two-component induction heating coil assembly 160 intended for use on a synthetic resin, one-half size pan 10a, illustrated in FIG. 1. The coil 160 is made up of two identical, mirror image coils 162 and 164, which are imprinted upon a unitary synthetic resin backing sheet 165. The coils 162, 164 are electrically isolated from each and are designed to operate, with respect to a given work coil 88, in a manner identical to that of the coil for a one-quarter size pan. Given the identical nature of the coils 162, 164, only coil 162 will be described in detail.

Specifically, the coil 162 includes a primary bottom zone 166 comprising traces 168, and a peripheral zone 170 surrounding the zone 166 and made up of traces 172; the traces 168 begin at point 173 and connect with the traces 172 at point 174. As in the case of the previous embodiments, the traces 168 and 172 define respective, nested rectangles, with the traces 172 being narrower in width than the traces 168.

The coil 162 further includes a pair of opposed, outwardly extending zones 176 and 178 designed to wrap upwardly around approximately one-half of the opposed sidewalls of the one-half size pan, as well as an end zone 180 designed to wrap upwardly around one of the pan end walls. Finally, the coil 162 includes a secondary bottom zone 182, which, with the zones 166 and 170, covers approximately one-half of the bottom wall of the pan.

The zones 176, 178 have traces 184 and 186, which are identical, mirror images of each other, and have a larger width outer segment 188, an intermediate segment 190 of lesser width, and an innermost segment 192 of lesser width than segment 190. The zone 180 includes traces 194, with an outermost, widest diameter trace segment 196, an intermediate trace segment 198 of lesser width, and an innermost trace segment 200 of minimal width. The secondary bottom zone 182 includes traces 202, which are of constant width. As illustrated in FIG. 7, the traces 184, 186 and 194 are all designed as serpentine sections.

The traces 172 of peripheral zone 170 interconnect with the traces 202 of zone 182 at point 204, and the opposite end of the traces 202 interconnects with the traces 186 of zone 178 at point 206. The traces 186 of zone 178 interconnect with the traces 194 of zone 180 at point 208. Finally the traces 194 of zone 180 interconnect with the traces 184 of zone 176, and such traces terminate at point 210.

A trace 212 is provided between the points 173 and 210, and is electrically isolated from all other traces, except at the connection points. The trace 212 includes a thermal switch 214 and a fuse 216, of the type previously described in the early embodiments. Another electrically isolated trace 218 is provided between the points 174 and 204, and is equipped with a thermal switch 220. The switch 214 is the high threshold switch, whereas the switch 220 is the low threshold switch. The switches 214 and 220, and fuse 216 operate in the same fashion as described previously in connection with embodiment 2 of FIG. 6.

In preferred forms, the coils 162 and 164 each behave identically with respect to an individual associated induction heater 89, and in a fashion identical to that of the coil 90 of the FIG. 6 embodiment. They can accordingly be considered to be coil modules, allowing an array of identical induction heaters 89 to be used to regulate different combinations of pans, such as pans 10, 10a, and 10b.

Embodiment 4 (FIGS. 1 and 2)—Induction Heated Warming Table Using a Networked Array of Identical Induction Heaters for Heating Food Holding Pans FIGS. 1 and 2 illustrate a food warming or heating table 222 having upright legs 224 supporting a deck 226. The deck 226 is recessed and has a non-conductive bottom wall 228, formed of glass or ceramic material, below the upper surface of the deck. A total of eight identical induction heaters 89, each having a work coil 88, are secured to the underside of bottom wall 228 with the work coils thereof exposed. It will be observed that the eight heaters 89 are arranged in pairs along the length of the deck 226. The recessed deck is designed to hold a variety of food-holding pans, such as the pair of one-quarter size pans 10 illustrated at the lefthand end of FIG. 1, a one-half size pan 10a immediately adjacent the pans 10, and a full size pan 10b adjacent the pan 10a. As previously described, each of the one-quarter size pans 10 is provided with a single susceptor coil 24, whereas the one-half size pan 10a is provided with the coil assembly 160 having the identical coils 162, 164. The full size pan 10b has the equivalent of two of the coil assemblies 160, each having the coils 162, 164.

FIG. 8 schematically depicts a pair of induction heaters 89 and illustrates their interconnection with a central digital processor or control unit 230. Additionally, one of the eddy current thermometers 232 associated with one or more of the induction heaters is illustrated. It will be appreciated that, with reference to table 222, there would be a total of eight induction heaters and at least one eddy current thermometer, each operably coupled with the control unit 230. Although in the depicted embodiment each induction heater 89 that employs the temperature regulation method employing temperature feedback from an improved eddy current thermometer system must have an associated field generating coil 242 and field receiving coil 248 so as to interrogate the pan's flat, thin disc 30, it is possible for a single eddy current thermometer 232 to have multiple field generating coils 242 and field receiving coils 248 operating from the same waveform generator 244 and signal processing circuit 252. Such a multiplexed eddy current thermometer with multiple generating/receiving coils could provide temperature information to the central control unit from multiple flat, thin discs 30, where each disc 30 is associated with a separate coil assembly being heated by its respective induction heater 89.

As previously described, each of the induction heaters 89 has a work coil 88 and control electronics, including inverter 89a and microprocessor 89b. The microprocessor 89b of each heater 89 is operably connected with a communication multiplexer 234 forming a part of control unit 230. The latter also includes a control microprocessor 236, a display 238, and a user input 240. Each of the eddy current thermometers is designed to periodically interrogate one or more of the disks 30 of coil 24 in order to determine the temperature of the disk to thereby control the heating of the associated coil 24 and thus pan or associated portion of said pan. Each thermometer 232 includes a field generating coil 242 driven by waveform generator 244 in order to create the interrogating magnetic field 246. The thermometer 232 also includes a field receiving coil 248, which receives the response field 250 from the disk 30. The coil 248 is coupled with signal processing circuitry 252 having interface 254. Finally, the circuitry 252 is connected to communication multiplexer 234 of unit 230.

Each of the induction heaters 89 employs a microprocessor 89b capable of hosting one or more control algorithms, e.g., an algorithm for controlling the previously described impedance detection temperature control system and/or an algorithm which employs a combination of impedance detection temperature control plus the continuous closed-loop feedback temperature control of the eddy current thermometer 232. Second, each induction heater 89 preferably has the ability to output a multitude of discrete power levels, i.e., in the preferred design each induction heater 89 employs duty cycling of its inverter output so as to achieve ten discrete power levels numbered 0-9. Power level 0 has a duty cycle of 0% (number of inverter cycles on per 60 cycles), and power level 9 has a 98% duty cycle, with power levels 1-8 being evenly spaced at intervals between levels 0 and 9. Third, each of the induction heaters 89 is equipped with a no-load detector, such as that previously described and as disclosed in U.S. Pat. Nos. 6,504,135 and 5,954,984. Finally, each induction heater 89 is preferably capable of accepting input from an external user interface, such as input 240, that allows the user to at least select "high," "medium," and "low" temperature settings for the individual inverter. As described in the impedance change control algorithm discussed below, this input will affect the initial power levels when certain pan states are detected.

Preferred optional features for the individual induction heaters 89 include the ability for the heaters to be linked together in a master/slave relationship. If linked master/slave, low-wattage, low-cost induction heaters can have their inverters synchronized at zero-cross so that the resultant magnetic fields produced are in phase.

Of course, when use is made of eddy current thermometers 232 for temperature feedback control in addition to impedance change feedback control, the heaters 89 must include an eddy current thermometer reader, i.e., field receiving coil 248, signal processing circuitry 252, and interface 254. Each induction heater 89 can be electronically integrated with its own dedicated eddy current thermometer reader, such that the reader's field generating coil and field receiving coil only couple to a single vessel. Alternatively, a multiplexed (multi-channel) eddy current thermometer with a single signal processing circuitry 252 and field generating coil 242 and multiple associated field generating coils 242 and field receiving coils 248 may also be used to provide temperature feedback information to multiple induction heaters 89.

The eddy current thermometer 232 provides a method and apparatus for determining the temperature of a pan susceptor coil by inducing an eddy current in a conducting member (e.g., disk 30), wherein the eddy current is induced by subjecting the disk to a magnetic field having a magnitude which varies substantially linearly over time (i.e., no more than about ±30% of true linearity), such that the corresponding eddy current magnitude changes exponentially over time. Next, a characteristic time constant of the exponential current magnitude change is determined, and the temperature of the pan coil is calculated using this characteristic time constant.

In preferred forms, the coil 242 is driven using a triangular waveform alternating current to induce the eddy current in the disk 30, and the receiving coil assembly 242, 252, 254 is provided to detect the corresponding eddy current-induced magnetic field. The output voltage of the receiving coil assembly is then used to determine the characteristic time constant. The receiving coil 248 advantageously comprises a pair of receiving coils in electrical series but of opposite phases, with the receiving coils located on opposite sides of the field transmitting coil. In order to facilitate the temperature measurement, the receiving coils are compensated so that, in the absence of the conducting member, the voltage output from the receiving coil assembly is zero.

Alternately, one eddy current thermometer reader could be made to have multiple channels of transmission/reception so that its waveform generator and signal processing circuit act, through its interface, to communicate with multiple induction heaters. In either case, the temperature of at least one thin conducting component, such as a disk 30, on each vessel's susceptor coil will be used by the appropriate induction heater microprocessor 89b to control the power output of its work coil 88 and thus control the temperature of the electromagnetically coupled vessel susceptor coil. In preferred practice, each induction heater 89 is capable of coupling between 150-250 watts to an associated modular susceptor coil so that virtually all magnetic field flux generated by the work coil 88 in the direction of the associated pan passes through the rectangular loops of the susceptor coil zones when the unit is set to power level 9 (98% on duty cycle).

As best seen in FIG. 2, an important benefit of the modular design of table 160 is that, should any one of the induction heaters 89 fail during operation, a simple replacement of the inexpensive inverter circuitry 89a can be made at low cost.

Operation

It will be readily apparent that the operation of table 160 is controlled through the medium of unit 230. The user inputs desired temperature ranges for the operation of each individual induction heater 89, and such selections initiate operation of the associated work coils 88, in order to heat each of the associated susceptor coils and thus pans or portions of pans. Such heating is controlled by the algorithms for each heater 89, making use of impedance change and/or eddy current thermometer temperature control.

Induction Heater Algorithm Instructions for Systems Employing Only Impedance Change Temperature Control, Such as Embodiment 2.

The design of the induction heatable susceptor coil 90 of embodiment 2 (FIG. 6), makes use of multiple coil zones 96-106, high and low threshold switches 152 and 158, and a thermal fuse 154. Accordingly, the interaction of susceptor coil 90 and the work coil 88 of one of the induction heaters 89 results in several distinct states that the induction heater microprocessor 89b can identify and use to execute a logical algorithm for temperature control at or around several different user-selected temperatures. The following state diagram (Table 1) defines these various states. Tables 2, 3, and 4 describe a simple, exemplary control algorithm used to temperature-regulate any size pan having the described modular susceptor coils of the invention. The algorithms of Tables 2-4 are used by the microprocessor 89b of a heater 89 when the user selects "high" (Table 2), "medium" (Table 3), or "low" (Table 4) on the input 230.

TABLE 1

Possible System States

| Mechanism Of Energy Transfer To Pan | Pan Circuit Status | Load Detected By Induction Heater | Pan Temperature Tp | Pan Position On Individual Heater | System State |
|---|---|---|---|---|---|
| None | N/A | <Low Load Threshold "No Load" | N/A | Off Heater Work Coil | 0 |
| 1. Greatest: Joule heating of entire circuit via induced continuous circuit current. 2. Lesser: Joule heating of bottom of pan circuit above work coil due to eddy currents generated within surface area of traces | Low Threshold Switch OPEN, High Threshold Switch CLOSED | ≥Low Load Threshold "High Load" | Tp ≤ Low Threshold Switch Temp | On Heater Work Coil | 1 |
| 1. Greatest: Joule heating of entire circuit except coil zone 98 via induced continuous circuit current. 2. Lesser: Joule heating of bottom of pan circuit above work coil due to eddy currents generated within surface area of traces | Low Threshold Switch CLOSED, High Threshold Switch CLOSED | ≥Low Load Threshold "Medium Load" Note: "Medium Load" is more than 20% less than "High Load" | Tp ≤ High Threshold Switch Temp, but Tp > Low Threshold Switch Temp | On Heater Work Coil | 2 |

TABLE 1-continued

Possible System States

| Mechanism Of Energy Transfer To Pan | Pan Circuit Status | Load Detected By Induction Heater | Pan Temperature Tp | Pan Position On Individual Heater | System State |
|---|---|---|---|---|---|
| 1. Minimal: Joule heating of bottom of pan circuit above work coil due to eddy currents generated within surface area of traces only during test pulses of magnetic field | Low Threshold Switch CLOSED, High Threshold Switch OPEN | <Low Load Threshold "Low Load" (Eddy Current Formation During Inverter Pulses) | Tp > High Threshold Switch Temp | On Heater Work Coil | 3 |
| Same as State 3 | Fuse Blown | Same as State 3 | Any Value of Tp | On Heater Work Coil | 4 |

The state Table 1 assumes that the associated induction heater 89 has 10 discrete power output levels, as previously describe.

It is assumed in Table 1 that the induction heater has 10 discrete power output levels, for simplicity numbered at 0 to 9, where power level 0 has duty cycle of 0% (number of inverter cycles on per 60 cycles) and power level 9 has 98% duty cycle, with power levels 1 through 8 being evenly spaced on intervals between.

A "State Flag" is set in the software algorithm (defaulted to 0) which is used in conjunction with the current value of load detected and/or a change in load detected by the induction heater's load detection system to set the power level of the inverter and possibly change the State Flag value. The following simple logic steps define what conjunctive actions (State Flag setting and power level setting) occur based upon certain current conditions (current State Flag value, load value detected, and load change detected). The "State Flag" setting generally reflects the system state (see Table 1).

Two software memory values are continually updated: 1) the "Last Power Level" used, i.e. the power level just prior to any pending conjunctive action; and 2) the "First Maintenance Power Level" used, i.e., the last power level set while the State Flag equals 1 and the load detection system detects that the low temperature threshold switch on the pan has closes so as to short out zone 98 of the coil heating element.

It is important to remember that an induction heater of this invention has a load detection system that employs a load threshold below which the inverter produces only test pulses (lasting milliseconds in duration) of alternating current in the work coil. Only when the load (from the vessel) detected causes the resonant circuit of the induction heater to operate at near resonance and is of magnitude greater than the low threshold value but less than a maximum value. Thus, if a steel pan is placed upon the induction heater work coil, it will cause the load detection system to detect a load out of bounds in magnitude and will cause the inverter resonant circuit to oscillate too far away from resonance. Thus, the inverter will move to the standby mode (State 0).

Furthermore, for this embodiment, the user may select three discrete temperature settings for the pan by selecting either "high", "medium" or "low" on the induction heater's control interface. Such a setting merely changes the software algorithm as described below in Table 2 (algorithm instructions for "high" temperature setting), Table 3 (algorithm instructions for "medium" temperature setting), and Table 4 (algorithm instructions for "medium" temperature setting). As will be seen in Tables 2, 3, and 4, the main differences in the algorithm for high, medium, and low are the default values of "First Maintenance Power Level" (9 for high, 7 for medium, 5 for low), as well as some of the changes in power level when the State Flag is equal to 2.

Of course, these simple algorithms described below can be made more complex, for instance, by employing time calculations that employ cycle timing within the induction heater. The induction heater microprocessor can measure the number of 60 (or 50) Hz cycles that elapse between the time the State Flag remains in value 2 (from the time it first changes from value 1 to 2 until it changes from value 2 to 3. By using this elapsed time, the values of "First Maintenance Power Level" as well as the number of power levels that should be reduced each time a "Low Load" condition is detected (when the high threshold switch opens) can be set more precisely.

TABLE 2

Induction Heater Algorithm Instructions for High Power Setting

| RESULTING ACTIONS | | REQUIRED CONDITIONS TO RESULT IN ACTIONS | | |
|---|---|---|---|---|
| Set Power Level To This Value | Set State Flag To This Value | Change In Load Detected | Load Detected | State Flag Value |
| 0 (Test Pulses Only) | 0 | N/A | Zero (Pan Off Heater) | Any |
| 9 | 1 | N/A | ≥Low Load Threshold | 0 |
| 9 | 1 | Steady, Increasing, or Decreasing ≤20% | ≥Low Load Threshold | 1 |

TABLE 2-continued

Induction Heater Algorithm Instructions for High Power Setting

| RESULTING ACTIONS | | REQUIRED CONDITIONS TO RESULT IN ACTIONS | | |
|---|---|---|---|---|
| Set Power Level To This Value | Set State Flag To This Value | Change In Load Detected | Load Detected | State Flag Value |
| 9 Save This Value as "First Maintenance Power Level" | 2 | Decreases >20% (Circuit Zone 98 is shorted by Closed Low Threshold Switch) | ≥Low Load Threshold | 1 |
| "Last Power Level" Minus 1 | 3 | N/A | <Low Load Threshold but Not Zero (Pan On Heater but High Threshold Switch has Opened) | Any |
| "First Maintenance Power Level" | 1 | Increases >20% (Circuit Zone 98 Has Reconnected to Rest of Coil Circuit by Opening of Low Threshold Switch) | ≥Low Load Threshold | 2 or 3 |

TABLE 3

Induction Heater Algorithm Instructions for Medium Power Setting

| RESULTING ACTIONS | | REQUIRED CONDITIONS TO RESULT IN ACTIONS | | |
|---|---|---|---|---|
| Set Power Level To This Value | Set State Flag To This Value | Change In Load Detected | Load Detected | State Flag Value |
| 0 (Test Pulses Only) | 0 | N/A | Zero (Pan Off Heater) | Any |
| 9 | 1 | N/A | ≥Low Load Threshold | 0 |
| 9 | 1 | Steady, Increasing, or Decreasing ≤20% | ≥Low Load Threshold | 1 |
| 7 Save This Value as "First Maintenance Power Level" | 2 | Decreases >20% (Circuit Zone 98 is shorted by Closed Low Threshold Switch) | ≥Low Load Threshold | 1 |
| "Last Power Level" Minus 1 | 3 | N/A | <Low Load Threshold but Not Zero (Pan ON Heater but High Threshold Switch has Opened) | Any |
| "First Maintenance Power Level" Plus 1 | 1 | Increases >20% (Circuit Zone 98 Has Reconnected to Rest of Coil Circuit by Opening of Low Threshold Switch) | ≥Low Load Threshold | 2 or 3 |

TABLE 4

Induction Heater Algorithm Instructions for Low Power Setting

RESULTING ACTIONS

| Set Power Level To This Value | Set State Flag To This Value | Change In Load Detected | Load Detected | State Flag Value |
|---|---|---|---|---|
| 0 (Test Pulses Only) | 0 | N/A | Zero (Pan Off Heater) | Any |
| 9 | 1 | N/A | ≥Low Load Threshold | 0 |
| 9 | 1 | Steady, Increasing, or Decreasing ≤20% | ≥Low Load Threshold | 1 |
| 5 Save This Value as "First Maintenance Power Level" | 2 | Decreases >20% (Circuit Zone 98 is shorted by Closed Low Threshold Switch) | ≥Low Load Threshold | 1 |
| "Last Power Level" Minus 1 | 3 | N/A | <Low Load Threshold but Not Zero (Pan On Heater but High Threshold Switch has Opened) | Any |
| First Maintenance Power Level + 2 | 1 | Increases >20% (Circuit Zone 98 Has Reconnected to Rest of Coil Circuit by Opening of Low Threshold Switch) | ≥Low Load Threshold | 2 or 3 |

Control of Systems Employing Both Impedance Change Temperature Control and Eddy Current Thermometer Temperature Control (FIG. 4).

To review, a pan employing one or more modular embodiment 1 susceptor coils 24 has at least one thermal switch that, when actuated, changes the impedance that the pan presents to the associated induction heater's work coil 88. For instance, in FIG. 4, the high threshold switch 84 completely opens the heating element circuit at 212° F. such that no circulating currents can thereafter be induced in the coil 24. Furthermore, embodiment 1 employs one or more thin conducting disks 30 to allow the associated induction heater's microprocessor to gather periodic temperature information that can be used as feedback to allow for temperature regulation of the pan.

In this case, the feedback information from the eddy current thermometer 232 can be used by the induction heater's microprocessor 89*b* (and/or by the central control microprocessor 236 in communication with the induction heater's microprocessor 89*b*) to enable a standard PID control algorithm to set the proper induction heater power level so as to achieve and hold a user selected (or preset) temperature for the pan (or food therein). This will be the predominant method of temperature regulation throughout use of the pan on the induction heater.

However, the impedance change information provided by the high threshold switch 84 can be used to augment this primary method of temperature control in several ways. First, it can be used as simply a limiting control temperature. Since the induction heater 89 will not transfer energy (except for the inconsequential amount due to periodic test pulses) to the pan once the high threshold switch 84 is open, the pan temperature should not be able to ever exceed the high threshold switch temperature unless this switch 84 fails in the closed position (in which case the thermal fuse 86 will prevent catastrophic high temperatures).

Second, the high threshold switch 84 can be used to periodically calibrate the eddy current thermometer 232. Since the high threshold switch temperature is known, and the presence or lack of presence of the pan atop the induction heater can be distinguished by the presence or lack of presence of the thin, conducting disk in the eddy current thermometer's field receiving coil's vicinity), the induction heater can allow periodic heating of the vessel's induction heating circuit until the high threshold switch is thrown. At that time, if the pan is detected by the eddy current thermometer 232 to be still in place atop the induction heater, the induction heater's microprocessor 89*b* can communicate to the eddy current thermometer 232 that the thin conducting disk 30 is at a known calibration temperature (212° F.), and the eddy current thermometer's signal processing unit can self-calibrate itself to 212° F.

Those skilled in the art will appreciate that the principles of the present invention may be implemented using a variety of different materials, dimensions, and techniques, other than those specifically described herein. For example, while the use of food pans fabricated from polysulfone is presently preferred, other types of synthetic resin material may be used, so long as the selected resins can withstand the conditions of use and have adequate thermal conductivity characteristics. In like manner, the described susceptor coils have copper traces applied to a synthetic resin backing. Other conductive materials can be used in lieu of copper, for example, silver or carbon ink. Moreover, the susceptor traces can be applied directly to surfaces of the synthetic resin pans themselves, without the use of a backing sheet. The susceptor coils can also be of different dimensions or shapes, as compared with the coils specifically illustrated and described herein. Further, the preferred temperature sensing disks are fabricated from pure copper sheeting having a thickness of 0.08 inches and a diameter of one inch; other conducting metals or materials can be used in lieu of copper, with different thicknesses and dimensions. The placement of the sensing disks is also variable at the option of the designer.

I claim:

1. An induction heatable food-holding pan, comprising:
a pan body including interconnected inner and outer mating shells presenting a bottom wall and upstanding sidewalls cooperatively defining a food-holding cavity;
at least one induction heatable susceptor coil sandwiched between said inner and outer mating shells, said coil including an elongated, continuous, electrically conductive trace having first and second ends and defining a current path, said first and second trace ends being electrically connected to each other, said coil operable, under the influence of an alternating magnetic field, to generate a current traveling along said current path and Joule heating within the coil, to thereby heat said pan body,
said trace having a plurality of zones each comprising a portion of said trace and capable of providing respective, different levels of Joule heating under the influence of said alternating magnetic field,
a first one of said zones located at said bottom wall of said pan body, and a second one of said zones located at a sidewall of the pan body,
at least one of said first and second zones of said trace having a length and a pair of spaced apart end points, said end points both spaced from said first and second ends of the trace,
at least a portion of said length of said trace of said at least one zone between said end points having a cross-sectional area different than the cross-sectional area of another of said zones, or is formed of material having an electrical resistivity different than the material forming the other of said zones, said one zone operable to generate Joule heating therein which is different than the Joule heating in the other of said zones; and
a metallic eddy current thermometer sensor attached to and in thermal contact with and electrically isolated from said coil, said sensor comprising an electrically conductive metallic sheet which is operable, under the influence of an alternating magnetic field, to generate eddy currents therein which can be detected by a remote field receiving coil, said sensor sandwiched between said inner and outer shells.

2. The food-holding pan of claim 1, said at least one susceptor coil comprising a plurality of electrically conductive traces operable to generate Joule heating therein under the influence of said alternating magnetic field.

3. The food-holding pan of claim 1, the traces of said one susceptor coil zone having a greater width than the traces of said other susceptor coil zone.

4. The food-holding pan of claim 1, said trace of said one susceptor coil zone having a greater height than said trace of said other susceptor coil zone.

5. The food-holding pan of claim 1, including at least one selectively operable thermal switch coupled with said susceptor coil and operable to alter the time period during which Joule heating is generated in one of said zones, as compared with the time period during which Joule heating is generated in another of said zones.

6. The food-holding pan of claim 5, said thermal switch operable when the susceptor coil reaches a predetermined temperature.

7. The food-holding pan of claim 1, said inner and outer shells formed of polysulfone material.

8. The food-holding pan of claim 1, including a thermal fuse coupled with said susceptor coil for terminating Joule heating of the susceptor coil when the fuse experiences a preselected cut out temperature.

9. The induction heating assembly of claim 1, including a thermal fuse coupled with said susceptor coil for terminating Joule heating of the susceptor coil when the fuse experiences a preselected cut out temperature.

10. An induction heatable article, comprising:
a body;
at least one induction heatable susceptor coil secured to said body and operable, under the influence of an alternating magnetic field, to generate Joule heating within the coil to thereby heat said body; and
a metallic eddy current thermometer sensor attached to and in direct thermal contact with and electrically isolated from said coil, said sensor comprising an electrically conductive metallic sheet which is operable, under the influence of an alternating magnetic field, to generate eddy currents therein which can be detected by a remote field receiving coil.

11. The induction heatable article of claim 10, said susceptor coil having a plurality of zones each adjacent a different portion of the body and capable of providing respective, different levels of Joule heating to said different portions of the body under the influence of said alternating magnetic field.

12. The induction heatable article of claim 10, said body being a food-heating pan having a bottom wall and a sidewall structure extending upwardly from said bottom wall, the inner surfaces of said bottom wall and sidewall structure cooperatively defining a food-holding cavity.

13. The induction heatable article of claim 10, said body formed of synthetic resin material.

14. The induction heatable article of claim 10, said body presenting a bottom and a sidewall structure extending upwardly from the bottom.

15. An induction heating assembly, comprising:
a substantially planar induction heating work coil operable to create an alternating magnetic field;
an induction heatable food-holding pan positioned over said work coil for heating of food within the pan, said pan comprising—
a pan body including interconnected inner and outer mating shells presenting a bottom wall and upstanding sidewalls cooperatively defining a food-holding cavity;
at least one induction heatable susceptor coil sandwiched between said inner and outer mating shells, said coil including an elongated, continuous, electrically conductive trace having first and second ends and defining a current path, said first and second trace ends being electrically connected to each other, said coil operable, under the influence of an alternating magnetic field, to generate a current traveling along said current path and Joule heating within the coil, to thereby heat said pan body,
said trace having a plurality of zones each comprising a portion of said trace and capable of providing respective, different levels of Joule heating under the influence of said alternating magnetic field, a first one of said zones located at said bottom wall of said pan body, and a second one of said zones located at a sidewall of the pan body, at least one of said first and second zones of said trace having a length and a pair of spaced apart end points, said end points both spaced from said first and second ends of the trace, at least a portion of said length of said trace of said at least one zone between said end points having a cross-sectional area different than the cross-sectional area of another of said zones, or is formed of material having an electrical resistivity different than the material forming the other of said zones, said one zone operable to generate Joule heating therein which is different than the Joule heating in the other of said zones; and a metallic eddy current thermometer sensor attached to and in direct thermal contact with and electrically isolated from said coil, said sensor comprising an electrically conductive metallic sheet which is operable, under the influence of an alternating magnetic field, to generate eddy currents therein which can be detected by a remote field receiving coil, said sensor sandwiched between said inner and outer shells.

16. The induction heating assembly of claim 15, said at least one susceptor coil comprising a plurality of electrically conductive traces operable to generate Joule heating therein under the influence of said alternating magnetic field.

17. The induction heating assembly of claim 15, the traces of said one susceptor coil zone having a greater width than the traces of said other susceptor coil zone.

18. The induction heating assembly of claim 15, said trace of said one susceptor coil zone having a greater height than said trace of said other susceptor coil zone.

19. The induction heating assembly of claim 15, including at least one selectively operable thermal switch coupled with said susceptor coil and operable to alter the time period during which Joule heating is generated in one of said zones, as compared with the time period during which Joule heating is generated in another of said zones.

20. The induction heating assembly of claim 19, said thermal switch operable when the susceptor coil reaches a predetermined temperature.

21. The induction heating assembly of claim 15, said inner and outer shells formed of polysulfone material.

* * * * *